United States Patent Office 3,845,000
Patented Oct. 29, 1974

3,845,000
POLYVINYL CHLORIDE PLASTIC FORMULATION AND METHOD OF FABRICATING THE SAME
Robert H. Pasley, Sr., Coral Gables, Fla., assignor to Royalty Designs of Florida, Inc., Hialeah, Fla.
No Drawing. Continuation of abandoned application Ser. No. 55,598, July 16, 1970. This application June 21, 1972, Ser. No. 264,848
Int. Cl. C08f 45/50
U.S. Cl. 260—30.6 R                    2 Claims

ABSTRACT OF THE DISCLOSURE

This disclosure deals with novel highly plasticized polyvinyl chloride plastic materials involving rather critical proportions of mixed plasticizers, and methods and formulations for rendering the same fireproof despite the inadequate supply of releasable chlorine occasional by the high quantities of plasticizers employed.

---

This is a continuation of application Ser. No. 55,598, filed July 16, 1970, now abandoned.

The present invention relates to polyvinyl chloride plastic compositions, being more particularly directed to highly plasticized compositions of the same, and formulations and methods for rendering the same fireproof or flame-resistant.

Polyvinyl chloride homopolymer and copolymer resins and plastic formulations thereof in general use have retarded and resisted burning by virtue of an adequate inherent supply of heat-releasable chlorine that serves to self-extinguish flaming. As disclosed in copending application Ser. No. 625,214, filed Mar. 22, 1967, for "Fabric Carried Plastic Articles and Process for Forming the Same," abandoned in favor of a continuation application, Ser. No. 64,000, filed June 19, 1970, now Pat. No. 3,705,-836, granted Dec. 12, 1972, there are special applications where highly unconventional proportions of plasticizer are incorporated in polyvinyl chloride compositions to produce quivery or highly resilient material. While these have been found admirably to serve the intended purposes, ranging from decorating, covering or otherwise providing resilient layers on fabrics, to providing cushions and floating or non-bottoming surfaces and the like, as well as sound, vibration and temperature insulation and isolation, there are instances where the tendency to flame or otherwise inadequately resist fire or very high temperatures (as a result of insufficient releasable chlorine in view of the very large proportions of plasticizer), is of concern. Where the resilient plastic is used in applications in the home or in other structures and vehicles where fire codes are stringent, as for roofing, weatherstripping, gasketing, floor and other coverings or other fabric-coated items and the like, the problem has arisen of rendering such quivery material fireproof while insuring that additives or coatings used for such purpose do not interfere with or deteriorate the quiver or resilient property or the life or other characteristics of the plastic item.

It is to the solution of this problem, accordingly, that the present invention is primarily directed, it being an object of the invention to provide a new and improved fireproof polyvinyl chloride quivery plastic formulation and method of fabricating the same.

A further object is to provide a novel fireproof plastic of more general utility, as well.

Other and further objects will be explained hereinafter and are more particularly delineated in the appended claims. In summary, however, from one of its important aspects, the invention contemplates a fireproof highly plasticized quivery polyvinyl chloride plastic comprising for each 100 parts of polyvinyl chloride resin at least substantially 400 parts of plasticizers of which at least substantially half comprises a phosphate plasticizer. Preferred compositions and method forming steps are hereinafter set forth.

Since it is not believed that a drawing is required adequately to teach the formulation method and composition, the invention will now be described with reference to polyvinyl chloride resin-to-plasticizer ratios ranging from the order of substantially 400-to-100 parts, to in excess of 1200-to-100 parts for plasticizer oil-exuding forms of the quivery solid material.

As described in said copending application, the heating of a liquid mixture of the resin and unconventionally large proportion of plasticizer to about 240° F. results in the formation of a gel. Continued heating to about 300–330° F. converts the gel into a molten reliquified state, following which gradual cooling enables the curing or setting into the ultimate quivery solid state. This may be done on any desired surface including upon a fabric or other openings-provided layer, as explained in said application, wherein the quivery plastic will become adherently locked within the openings or fibers and will provide a wide range of stretch, compression and give in a unitary manner with the fabric, acting also as a cushion or protective layer for the same, if desired.

The large and predominant amount of plasticizer, however, renders the amount of releasable chlorine, under flame, insufficient to provide inherent fireproof qualities to such quivery material, and it is to this problem, among others, that the invention is directed in one of its important aspects.

Attempts to render the material fireproof by conventional additives, moreover, were found wanting in important particulars. The use of aluminum hydroxide additive, for example, while enabling the release of water at high temperature, rendered the material stiff and much less flexible than is required of the quivery mass for the applications above described. Phosphate additives, in addition, were found deleteriously to change the color of the plastic as a result of the inherent lack of heat stability of such compounds. Spray and other coatings, moreover, were found not adequately to adhere to the surface of the quivery mass and also to be unsatisfactory after flexing and after continued exposure to the elements, as on a roof.

It was finally discovered, however, that with a rather critical blend of plasticizers, one could maintain all of the desired quivery properties of the plastic mass while rendering the same remarkably fireproof. Specifically, it was found that the plasticizer should comprise preferably both a phthyalate plasticizer and a phosphate plasticizer, with at least half the plasticizer content comprising the latter. In the case of a substantially 400 parts-to-100 parts plasticizer-to-polyvinyl chloride resin composition, for example, an excellent formulation embodies a phthyalate-to-phosphate plasticizer ratio of about 2-to-3, and with a few parts (about 3, for example) of barium-cadmium-zinc stabilizer added, and a few parts (about 5, for example) of an epoxy plasticizer which serves to prevent degradation of heat in the early stages of the formulation. Flaming tests with several cycles of a 1300±50° F. flame, searing the material with a 12 mile per hour velocity for successive one minute intervals, demonstrated that the surface immediately formed a protective char and did not burn. With this plastic adhered to a fireproof canvas fiber cloth and extending in relief therefrom in about a sixteenth of an inch thickness, the plastic resisted any burning or even charring through to the fabric layer.

The preferred phthyalate plasticizer for these tests was the Monsanto Type 711; and the phosphate plasticizer was a mixture of the Monsanto Types 148 and 140. Monsanto Types 140 and 148 are listed on pages 478-9 of *1968 Modern Plastics Encyclopedia* (items 276 and 281) as Santicizer 140 (51) and Santicizer 148(51), respectively a cresyl diphenyl phosphate and an alkyl aryl phosphate. Since these tests were of the type accepted for non-combustible roofings, there was added into the plastic less than one percent of aluminum powder to give a silvery color and to aid in heat reflectance for roof covering purposes. Weather testing for over 1400 hours, moreover, showed no signs of deterioration of the material.

As another example, where quivery properties and even oil-exuding or lubricating properties are desired, as with the greater proportions of plasticizer, in excess of 400 parts, previously discussed, the more concentrated (though more expensive) phosphate plasticizer, such as the said type 140 is preferred.

As still another illustration, though aluminum hydroxide inert filler additive tends to stiffen the plastic, it has been found possible to add the same to the phosphate plasticizer and to attain fireproofing results.

During the preparation, moreover, the tendency of the phosphate plasticizer to degrade because of its lack of heat stability and to cause the deleterious color changes of the plastic, before explained, has been remarkably overcome by insuring the moving of the plastic during the gelling and converting steps along flow paths, such as channels or pipes, thus avoid prolonged static heating conditions in large masses.

Further modifications will occur to those skilled in this art and all such are considered to fall within the spirit and scope of the invention as defined in the appended claims.

What is claimed is:

1. A method of preparing a fireproof highly plasticized quivery essentially homopolymer polyvinyl chloride plastic, that comprises, forming a liquid mixture consisting essentially of for each 100 parts of polyvinyl chloride resin of the order of substantially 400 parts of phosphate plasticizer, heating said liquid to about 240° F. to bring the same to a gel state, further heating the gel to at least about 300 to 330° F. to convert the same into a molten form, the heating steps being effected while moving the heated material along a plurality of pipes to prevent prolonged static heating of the phosphate plasticizer in large masses that would otherwise effect color change in the plastic, and gradually cooling the said molten form to cure it into a quivery solid form.

2. A method as claimed in Claim 1 and in which the liquid mixture includes a few parts of a barium-cadmium-zinc stabilizer.

References Cited

UNITED STATES PATENTS

| | | | |
|---|---|---|---|
| 2,861,963 | 11/1958 | Butsch | 260—30.6 R |
| 3,084,127 | 4/1963 | Vakousky | 260—30.6 R |
| 3,492,279 | 1/1970 | Folzenlogen | 260—30.6 R |
| 3,288,729 | 11/1966 | Waterman | 260—30.6 R |
| 3,563,939 | 2/1971 | Stevens | 260—41 B |
| 3,705,836 | 12/1972 | Francis | 161—116 |

MORRIS LIEBMAN, Primary Examiner

P. R. MICHL, Assistant Examiner

U.S. Cl. X.R.

260—31.8 G